(12) United States Patent
Chern

(10) Patent No.: US 6,334,513 B1
(45) Date of Patent: Jan. 1, 2002

(54) DISC BRAKE ASSEMBLY FOR A BICYCLE

(75) Inventor: Bang-Shiong Chern, Taichung Hsien (TW)

(73) Assignee: Yih Cherng Co., Ltd., Fengyuan (TW)

( * ) Notice: Subject to any disclaimer, the term of this patent is extended or adjusted under 35 U.S.C. 154(b) by 0 days.

(21) Appl. No.: 09/491,655

(22) Filed: Jan. 27, 2000

(51) Int. Cl.⁷ ............................................. F16D 55/02
(52) U.S. Cl. ...................................................... 188/71.7
(58) Field of Search .......................... 188/24.11, 24.19, 188/24.22, 71.7, 73.31, 72.8, 72.7, 196 M

(56) References Cited

U.S. PATENT DOCUMENTS 4,050,549 A * 9/1977 Hori ........................... 188/72.8
4,084,666 A * 4/1978 Karasudani ................. 188/73.3

* cited by examiner

Primary Examiner—Christopher P. Schwartz
Assistant Examiner—C. T. Bartz
(74) Attorney, Agent, or Firm—Alan Kamrath; Rider, Bennett, Egan & Arundel, LLP

(57) ABSTRACT

A disc brake assembly for a bicycle includes a connecting bar and a brake disc each mounted on a bicycle. The connecting bar includes a pivot hole defined in one end and a lug extending from the other end. The lug has a bore defined therein. A casing with two brake pads is movably attached to the connecting bar. An ear extends from the casing and has a threaded hole defined therein corresponding to the pivot hole of the connecting bar. Another ear extends from the casing and has a hole defined therein corresponding to the bore of the lug of the connecting bar. An adjusting device is mounted on the casing and connected to the connecting bar. Rotating the adjusting device can adjust the distance of the casing and the connecting bar. Furthermore, the gaps between the brake disc and the brake pads are adjusted.

4 Claims, 2 Drawing Sheets

DISC BRAKE ASSEMBLY FOR A BICYCLE

BACKGROUND OF THE INVENTION

1. Field of the Invention

The present invention relates to a disc brake assembly, and more particularly to a disc brake assembly for a bicycle.

2. Description of Related Art

A conventional disc brake for a bicycle comprises a casing with a recess and a cylinder. The cylinder communicates with the recess. A brake mechanism is mounted in the cylinder and has a shaft partially extending through the casing. A lever is attached to the shaft. A brake pad is attached to one side of the recess of the casing, and another brake pad is attached to the end of the brake mechanism. The two brake pads align with each other. The two brake pads squeeze a brake disc that is mounted on a wheel of a bicycle.

When the lever is pulled, the brake pad attached to the brake mechanism presses against the brake disc. As the brake pad attached to the brake mechanism continues to press against the disc, the brake disc deflects and presses against the brake pad attached to the side of the recess. Therefore, the brake pad attached to the brake mechanism wears faster than the brake pad attached to the side of the recess. Consequently, the gap between the brake pad attached to the brake mechanism and the brake disc becomes wider as the brake is used and the braking effect is reduced.

The present invention has arisen to mitigate and/or obviate the disadvantages of the conventional disc brake for a bicycle.

SUMMARY OF THE INVENTION

In accordance with one aspect of the present invention, a disc brake assembly for a bicycle includes a casing and a connecting bar. The connecting bar is attached to the fork of a bicycle, and the casing is movably mounted on the connecting bar. The casing has two brake pads to squeeze a brake disc. An adjusting device is received in the casing and is parallel to the axle of the wheel of the bicycle. Rotating the adjusting device can adjust the relative position of the casing and the connecting bar. Furthermore, the gap between the brake disc and the brake pad is adjusted.

Further benefits and advantages of the present invention will become apparent after a careful reading of the detailed description with appropriate reference to the accompanying drawings.

DETAILED DESCRIPTION OF THE INVENTION

Figure 1:
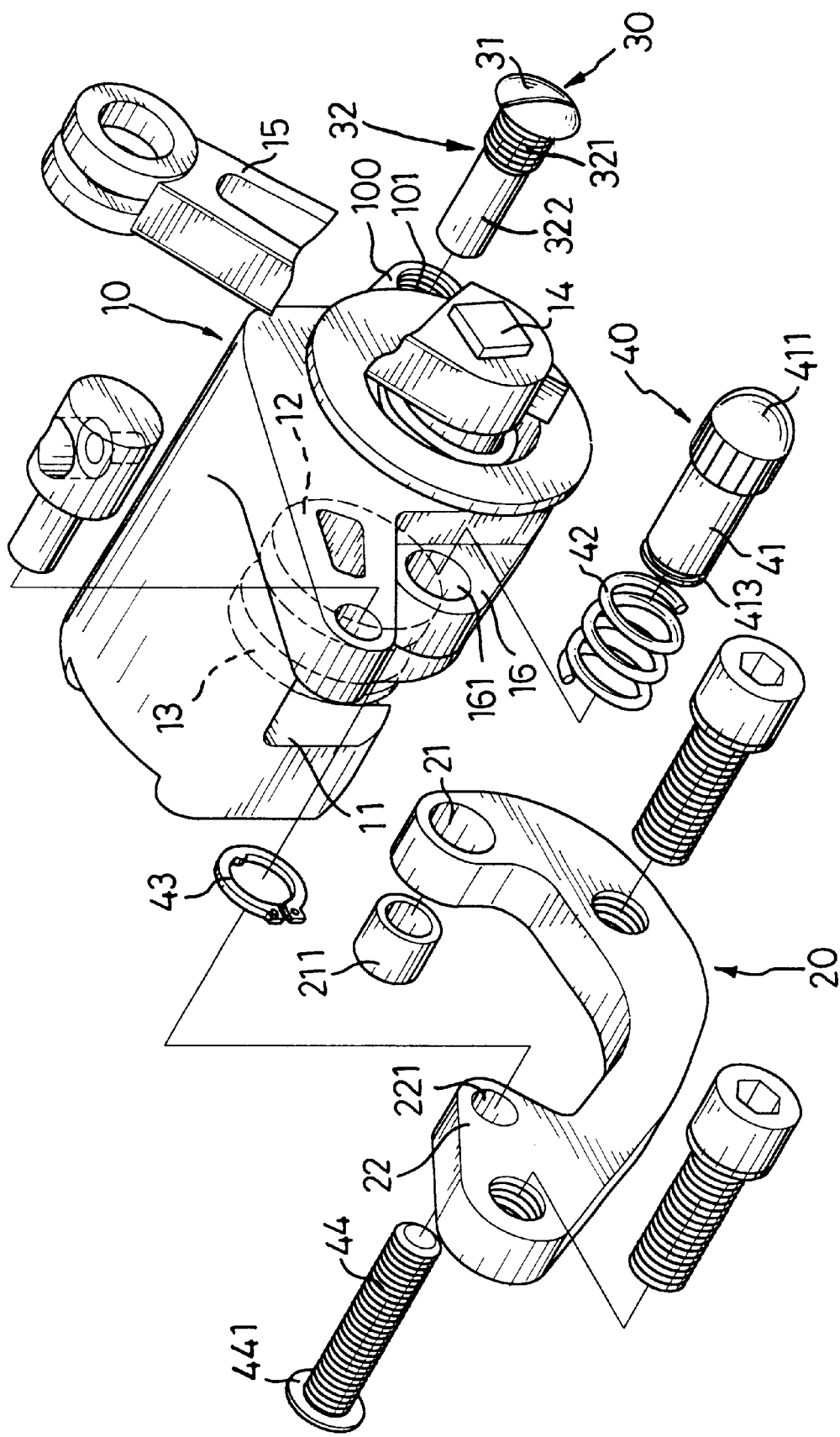
FIG. 1 is a perspective exploded view of a disc brake assembly for a bicycle in accordance with the present invention.
Figure 3:
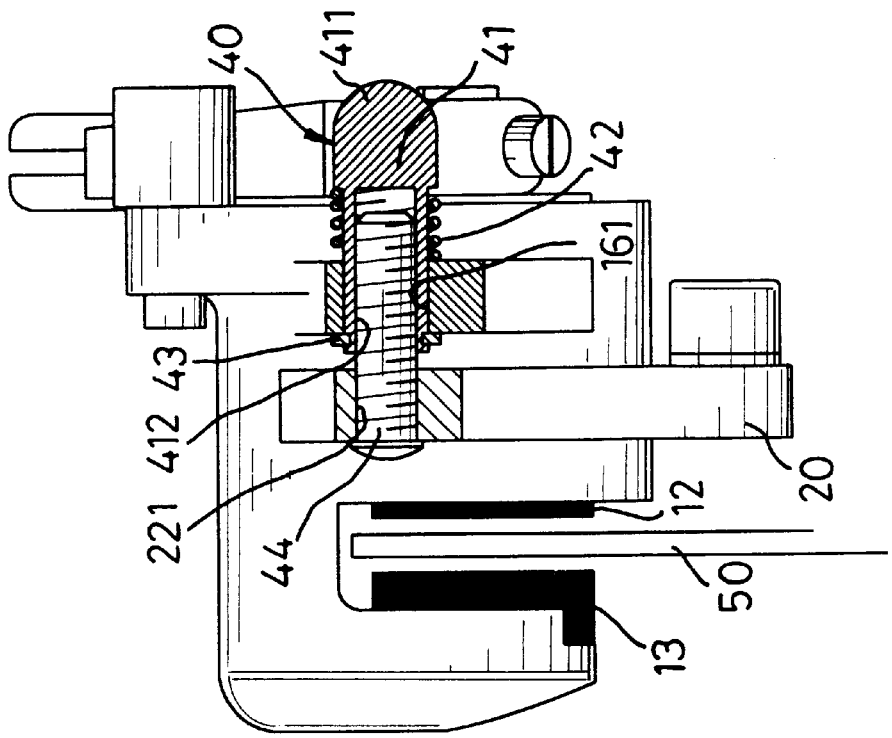
FIG. 3 is a schematic operational view of the brake disc assembly in FIG. 1.
Figure 2:
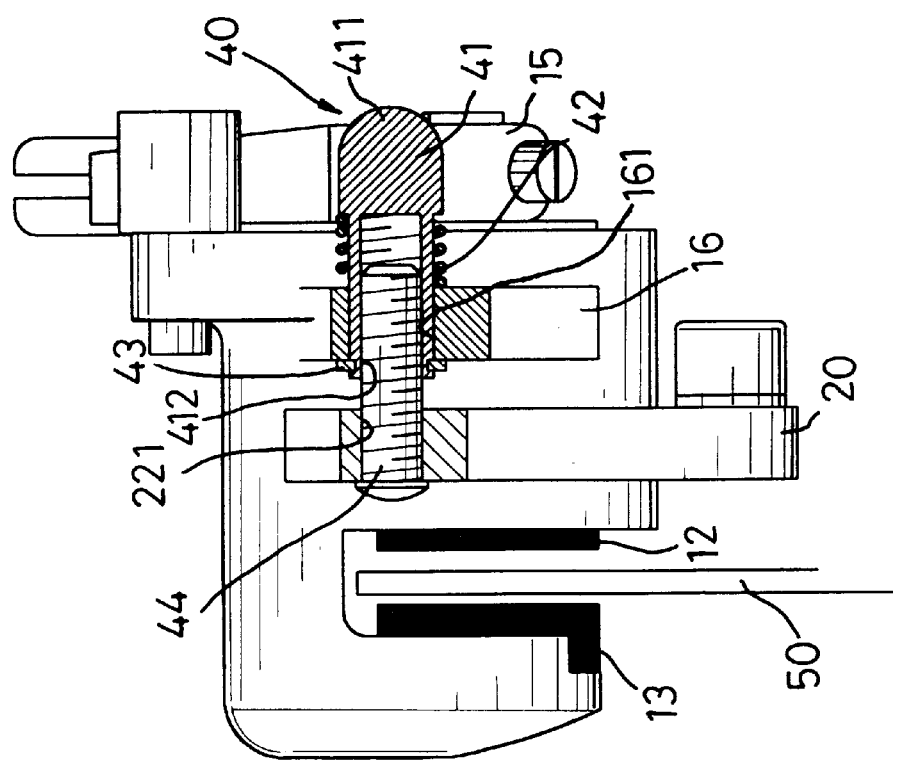
FIG. 2 is a front plan view in partial section of the brake disc assembly in FIG. 1.

Referring to the drawings and initially to FIGS. 1–2, a disc brake assembly for a bicycle in accordance with the present invention comprises a connecting bar (20) attached to the fork of a bicycle (not shown), a casing (10) movably mounted on the connecting bar (20) and an adjusting device (40) attached to the casing (10).

A pivot hole (21) is defined in one end of the connecting bar (20), and a lug (22) extends from the other end. A bore (221) is defined in the lug (22). A bushing (211) is pressed into the pivot hole (21) in the connecting bar (20).

A brake mechanism (not numbered) is mounted in the casing (10) and has a shaft (14) partially extending through the casing (10). A lever (15) is attached to the free end of the shaft (14). A recess (11) is defined in the casing (10) opposite from the lever (15). A brake pad (13) is attached to one side of the recess (11) of the casing (10) and another brake pad (12) is attached to the facing end of the brake mechanism and is aligned with the brake pad (13) attached to the side of the recess (11). The brake pads (12, 13) face each other. A brake disc (50) is mounted on a wheel of a bicycle (not shown) with the periphery of the disc (50) between the two brake pads (12, 13). The two brake pads (12, 13) squeeze the brake disc (50) when the brake mechanism is rotated. A first ear (100) extends from the casing (10) and has a threaded hole (101) defined therein. A second ear (16) extends from the casing (10) and has a hole (161) defined therein. The threaded hole (101) corresponds to the pivot hole (21) in the connecting bar (20) and the hole (161) in the second ear (16) corresponds to the bore (221) in the lug (22) of the connecting bar (20).

A connecting rod (30) includes a head (31) and a shank (32), with the shank (32) extending through the threaded hole (101) in the first ear (100). The head (31) has a diameter which is bigger than that of the threaded hole (101). The shank (32) has a threaded portion (321) formed near the head (31) that is screwed into the threaded hole (101). The shank (32) further has a pivot portion (322) axially extending from the threaded portion (321) and rotatably received in the bushing (211).

The adjusting device (40) includes a tubular stub (41) and a bolt (44) screwed into the tubular stub (41). A knob (411) is formed on the closed end of the tubular stud (41), and an external groove (413) is formed near the open end. An internal thread (412) is defined in the tubular stub (41). A spring (42) is mounted around the tubular stud (41) between the knob (411) and the second ear (16) of the casing (10) without an internal thread. A C-ring (43) is fit into the groove (413) on the tubular stub (41) after the end of the tubular stub (41) is pushed through the hole (161) in the second ear (16). The bolt (44) is inserted through the bore (221) of the lug (22) and screwed into the internal thread (412) in the tubular stub (41). The head (441) of the bolt (44) abuts the connecting bar (20).

When the lever (15) is pulled, the brake pad (12) attached to the end of the brake mechanism presses the brake disc (50) first, and the brake pad (13) attached to the side of the recess (11) is pressed by the brake disc (50) later. Therefore, the brake pad (12) attached to the end of the brake mechanism wears faster than the brake pad (13) attached to the side of the recess (11). Consequently, after a period of use, the gap between the brake pad (12) attached to the end of the brake mechanism and the brake disc (50) becomes wider and the braking effect is reduced.

To restore the braking effect, the knob (411) on the adjusting device (40) is rotated to draw the bolt (44) deeper into the tubular stub (41) and adjusts the relative position of the casing (10) and the connecting bar (20). As a result, the gap between the brake disc (50) and the brake pads (12, 13) is adjusted to position the brake disc (50) in the center between the brake pads (12, 13).

Although the invention has been explained in relation to its preferred embodiment, it is to be understood that many other possible modifications and variations can be made without departing from the spirit and scope of the invention as hereinafter claimed.

What is claimed is:

1. A disc brake assembly for a bicycle, with the bicycle having a brake disc mounted on a wheel, the disc brake assembly comprising:

a connecting bar adapted to be mounted on the bicycle, with the connecting bar including a pivot hole defined in a first end and a lug extending from a second end, with the lug having a bore defined therein;

a casing with two brake pads movably attached to the connecting bar, with a gap between the two brake pads being adapted to receive the brake disc;

a first ear extending from the casing;

a connecting rod removably connected to the first ear and inserted into the pivot hole of the connecting bar;

a second ear extending from the casing and having a hole defined to correspond to the bore of the lug of the connecting bar; and an adjusting device mounted on the casing and connected to the connecting bar to adjust a distance between the brake disc and said two brake pads, with the adjusting device including:

a tubular stub mounted on the casing, with the tubular stub having a first end forming a knob, a second end containing a groove near the first end and an interior thread defined therein;

a bolt penetrating the bore of the lug to screw into the interior thread of the tubular stub and having a head defined to abut the connecting bar;

a spring mounted around the tubular stub between the knob and the second ear of the casing; and a C-ring inserted into the groove of the tubular stub after the end of the tubular stub is inserted through the second ear.

2. The brake disc assembly as claimed in claim 1, wherein the connecting bar includes a bushing received in the pivot hole for receiving the connecting rod.

3. The brake disc assembly as claimed in claim 1, wherein the first ear has a threaded hole defined to correspond to the pivot hole of the connecting bar; and wherein the connecting rod has a head and a shank, with the head having a diameter that is bigger than that of the threaded hole, with the shank having a threaded portion near the head screwed into the threaded hole and with the shank having a pivot portion extending through the threaded hole to be inserted into the pivot hole.

4. The brake disc assembly as claimed in claim 3, wherein the connecting bar includes a bushing received in the pivot hole for receiving the connecting rod.

* * * * *